United States Patent [19]
Nishide et al.

[11] Patent Number: 5,725,249
[45] Date of Patent: Mar. 10, 1998

[54] PRELOADER APPARATUS

[75] Inventors: Seiji Nishide; Hideki Tanaka, both of Aichi-ken, Japan

[73] Assignee: Kabushiki Kaisha Tokai-Rika-Denki-Seisakusho

[21] Appl. No.: 678,042

[22] Filed: Jul. 10, 1996

[30] Foreign Application Priority Data

Jul. 13, 1995 [JP] Japan ................................ 7-177737

[51] Int. Cl.⁶ .................................................. B60R 22/46
[52] U.S. Cl. .................................... 280/806; 297/480
[58] Field of Search ........................ 280/806; 297/480, 297/482; 242/374

[56] References Cited

U.S. PATENT DOCUMENTS

| | | | |
|---|---|---|---|
| 4,917,210 | 4/1990 | Danicek et al. | 280/806 |
| 5,211,423 | 5/1993 | Krambeck | 280/806 |
| 5,364,129 | 11/1994 | Collins et al. | 280/806 |

FOREIGN PATENT DOCUMENTS

| | | | |
|---|---|---|---|
| 41 37 211 | 5/1992 | Germany | 280/806 |
| 42 30 665 | 3/1994 | Germany | 280/806 |
| 6-270762 | 9/1994 | Japan | 280/806 |
| 6-65121 | 9/1994 | Japan. | |

*Primary Examiner*—Peter C. English
*Attorney, Agent, or Firm*—Sixbey Friedman Leedom & Ferguson; Thomas W. Cole

[57] ABSTRACT

A preloader apparatus retracts, upon quick deceleration of a vehicle, a buckle apparatus with which a tongue plate for supporting a webbing is engaged so as to fasten the webbing onto an occupant of the vehicle. The preloader apparatus has a flexible wire connected to the buckle apparatus and used to retract the buckle apparatus and a supporting member which supports the wire so as to maintain a predetermined portion of the wire in the standing state and whose supporting function is canceled upon retraction of the buckle apparatus. Accordingly, the buckle apparatus can be maintained in a predetermined standing state.

11 Claims, 11 Drawing Sheets

PRELOADER APPARATUS

BACKGROUND OF THE INVENTION

1. Field of the Invention

The present invention relates to a preloader apparatus for retracting a buckle for a seat belt system upon quick deceleration of a vehicle.

2. Description of the Related Art

In a seat belt apparatus of a vehicle, a tongue plate, through which a webbing passes and which is located at the central portion of the webbing, is engaged with a buckle located at a side of a seat, thereby fastening the webbing on a vehicle occupant. A preloader apparatus for improving the performance of such a seat belt apparatus is known. Upon quick deceleration, the preloader apparatus retracts the buckle from its normal position so as to tighten the webbing, thereby improving the initial restraint of the occupant.

For example, such a preloader apparatus serving as a buckle retracting mechanism has a plate base mounted using a bolt to the side wall of a seat which is supported such that its position is adjustable in the longitudinal direction of a vehicle. A pulley is pivotably mounted on the plate base at the side toward which the buckle is to be retracted. One end of a wire is connected to the pulley while the other end of the wire is connected to the buckle. An acceleration sensor for detecting a negative acceleration generated upon quick deceleration of a vehicle and a gas generator for generating a large amount of gas are disposed on the plate base.

When the acceleration sensor operates upon quick deceleration of a vehicle, a large amount of gas is generated within the gas generator. The generated gas causes a piston to move within a cylinder, resulting in a tensile force being applied to a wire connected to the piston. Due to this tensile force of the wire, the buckle is retracted via the wire and the pulley.

For easy insertion of the tongue plate into the buckle, the buckle is supported in the standing state on the plate base. However, since the buckle is connected with and supported by the wire, in some cases the buckle may not be held at a fixed position. To solve this problem, the rigidity of the wire must be increased. However, it is difficult for a wire having a higher rigidity to be connected to and wound onto the pulley. In other words, the wire must be flexible to be wound onto the pulley. Due to the flexibility of the wire itself and the weight of the buckle, the wire deflects, resulting in a failure to maintain its standing state.

In order to help the wire maintain the standing state, the wire may be supported by a supporting member. However, a support portion of the supporting member may hinder retraction of the buckle.

SUMMARY OF THE INVENTION

In view of the foregoing, it is an object of the present invention to provide a preloader apparatus which does not hinder retraction of a buckle and which can maintain the buckle at a predetermined position.

According to a first aspect of the present invention, there is provided an improved preloader apparatus. Upon quick deceleration of a vehicle, the preloader apparatus retracts a buckle apparatus with which a tongue plate for holding a webbing is engaged so as to fasten the webbing onto an occupant of the vehicle. The preloader apparatus comprises a flexible elongated member connected to the buckle apparatus and used to retract the buckle apparatus, and a supporting member which supports the elongated member so as to maintain a predetermined portion of the elongated member in the standing state and whose supporting function is canceled upon retraction of the buckle apparatus.

According to the first aspect, the flexible elongated member connected to the buckle apparatus is supported by the supporting member, thereby being held in the standing state. Upon quick deceleration of a vehicle, since the flexible elongated member is retracted, the buckle apparatus is retracted from its normal position to a retraction position. As a result, the webbing is further tightened onto the occupant. When the buckle apparatus is retracted, the supporting member's function of supporting the flexible elongated member is canceled, whereby the supporting member does not hinder retraction of the buckle apparatus.

The flexible elongated member may be a wire, rope, or the like. A loop portion is formed on the wire, rope, or the like, which is connected to the buckle apparatus via the loop portion. The predetermined portion of the elongated member is composed of two parallel portions, each of which extends from the loop portion. Twisted portions are provided between the loop portion and the parallel portions such that a plane containing the loop portion is substantially perpendicular to a plane containing the parallel portions. The supporting member may be a plate member made of a hard synthetic resin. The plate member supports the parallel portions and has a support portion which is sheared off upon retraction of the buckle apparatus so as to allow the buckle apparatus to be retracted.

According to a second aspect of the present invention, there is provided another improved preloader apparatus. Upon quick deceleration of a vehicle, the preloader apparatus retracts a buckle apparatus with which a tongue plate for holding a webbing is engaged so as to fasten the webbing onto an occupant of the vehicle. The preloader apparatus comprises a flexible elongated member connected to the buckle apparatus, driving means for retracting the buckle apparatus by applying a tensile force to the elongated member upon quick deceleration of the vehicle, and a supporting member which supports the elongated member so as to maintain a predetermined portion of the elongated member in the standing state and whose supporting function is canceled upon retraction of the buckle apparatus.

According to the second aspect, the driving means may include a piston connected to an end portion of the elongated member opposite to the buckle apparatus, and a gas generator for instantaneously generating gas upon quick deceleration of the vehicle so as to drive the piston, thereby retracting the buckle apparatus.

DESCRIPTION OF THE PREFERRED EMBODIMENT

An embodiment of a preloader apparatus of the present invention will now be described with reference to FIGS. 1 to 11. Arrow FR denotes the direction toward the front of a vehicle, arrow RE denotes the direction toward the rear of the vehicle, arrow W denotes the widthwise direction of the vehicle, and arrow UP denotes the direction toward the upper portion of the vehicle.

Figure 11:
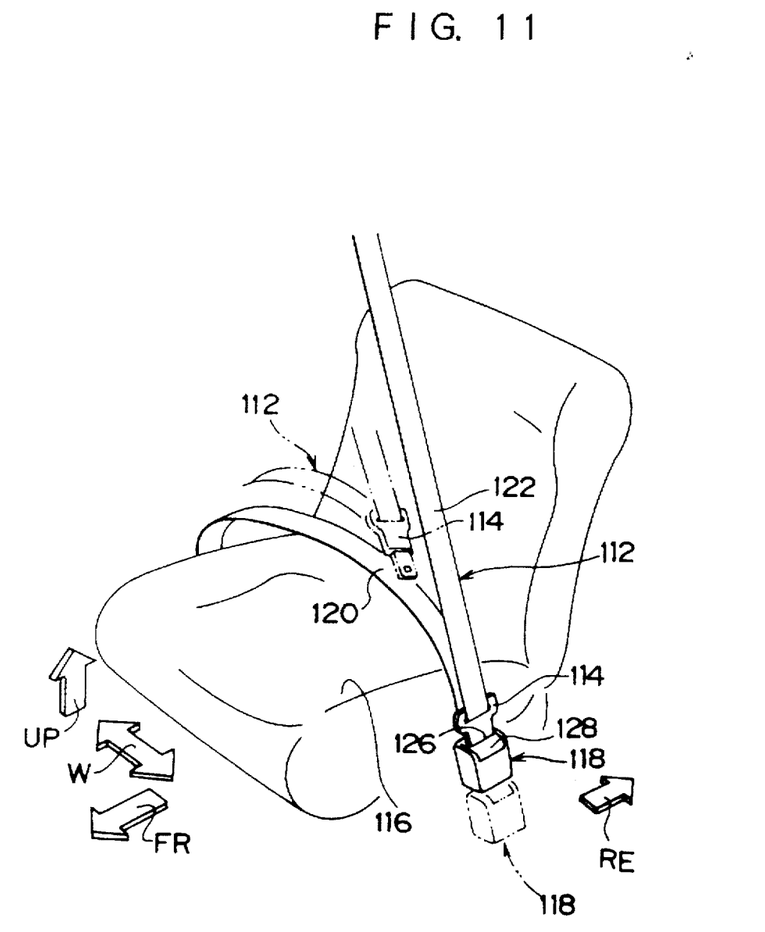
FIG. 11 is a perspective view showing a seat belt apparatus to which the preloader apparatus according to the embodiment is applied.

FIG. 11 shows a 3-point fastening seat belt apparatus of a vehicle to which the preloader apparatus of the present invention is applied. One end of a webbing 112 is taken up onto an unillustrated take-up apparatus, the intermediate portion of the webbing 112 passes through a shoulder-through anchor (not shown) located at the upper portion of a side wall of the vehicle, and the other end of the webbing 112 is supported by an outer anchor (not shown) located at the right side of a seat 116. The portion of the webbing 112 between the shoulder-through anchor and the outer anchor passes through a tongue plate 114. The tongue plate 114 is shifted from a state illustrated by a two dots-and-dash line to a state illustrated by a solid line and inserted into a tongue plate reception port 126 of a buckle 118 located at the left side of the seat 116, thereby engaging with the buckle 118. Thus, the webbing 112 is fastened onto an occupant, so that the portion of the webbing 112 between the outer anchor and the tongue plate 114 serves as a lap webbing 120 and the portion of the webbing 112 between the tongue plate 114 and the shoulder-through anchor serves as a shoulder webbing 122.

The buckle 118 has a lock member which is urged by an elastic member to engage with the tongue plate 114. By pressing a release button 128, the engagement between the tongue plate 114 and the buckle 118 is canceled so as to release the passenger from the webbing 112.

Figure 1:
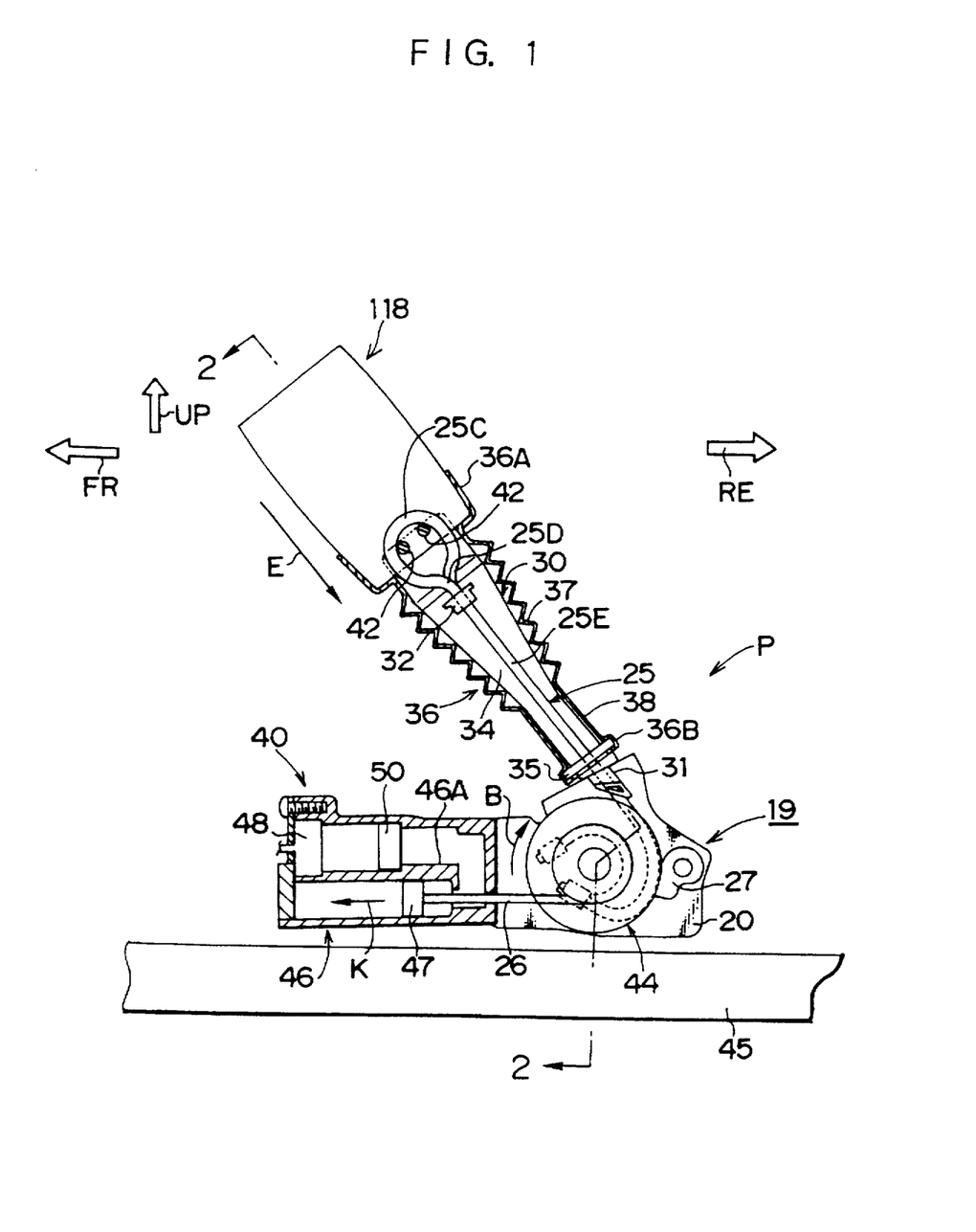
FIG. 1 is a front view of a preloader apparatus according to an embodiment of the present invention, as viewed from the side of a vehicle, which shows a state in which a buckle is located at its normal position.

Upon quick deceleration of the vehicle, the buckle 118 is retracted downward by the preloader apparatus P shown in FIG. 1 from its normal position (illustrated by a solid line in FIG. 11) to a retraction position (illustrated by a two dots-and-dash line in FIG. 11). This further tightens the webbing 112, thereby improving the initial restraint of the occupant.

As shown in FIG. 1, a main body portion 40 of the preloader apparatus P is fixed onto a base plate 20. The base plate 20 is mounted using an unillustrated mounting bolt onto the side surface of a frame of the seat 116 (see FIG. 11) which is supported such that its position is adjustable in the longitudinal direction of the vehicle.

Figure 2:
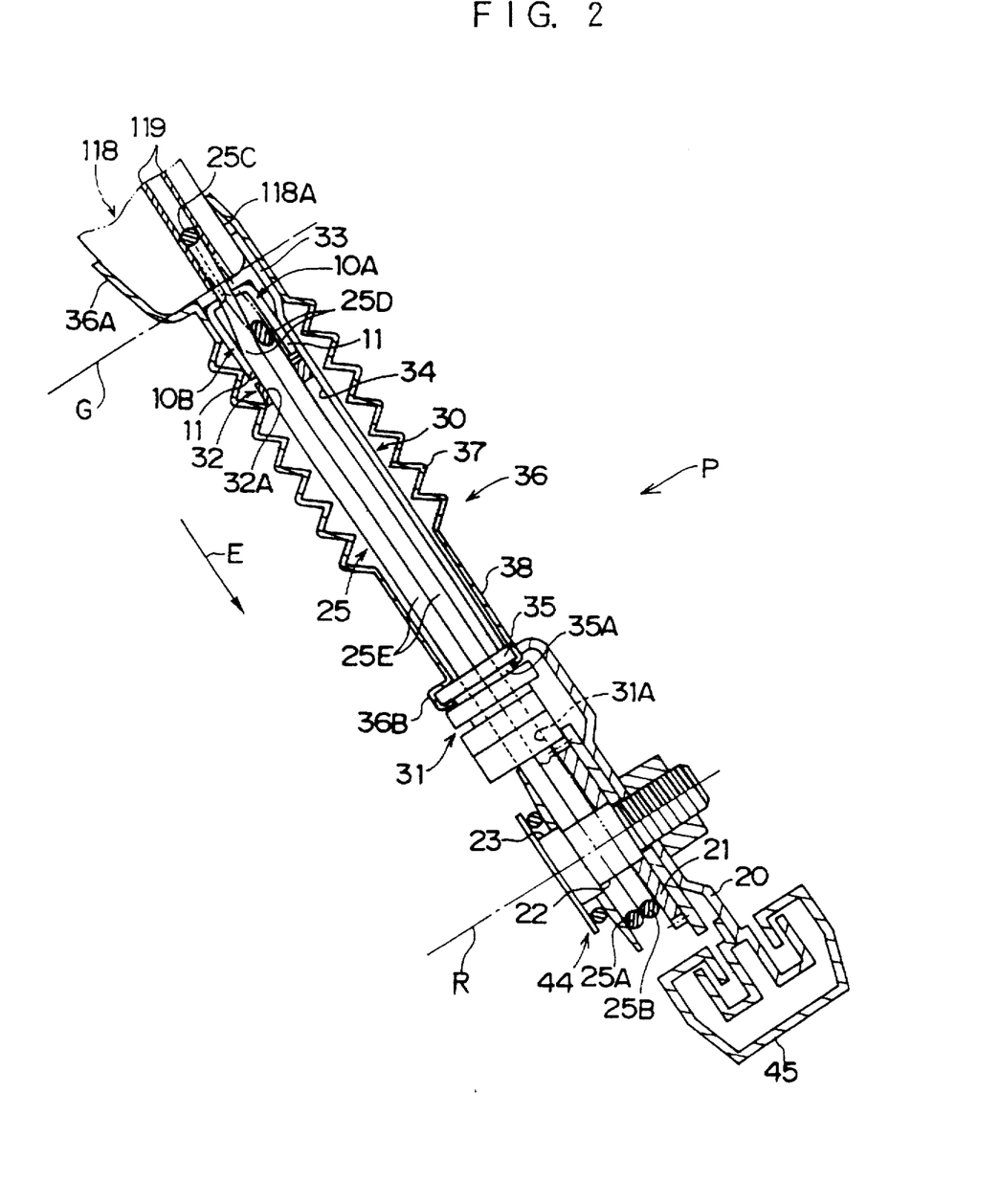
FIG. 2 is a cross-sectional view taken along line 2—2 of FIG. 1 showing a main portion of the preloader apparatus according to the embodiment.
Figure 3:
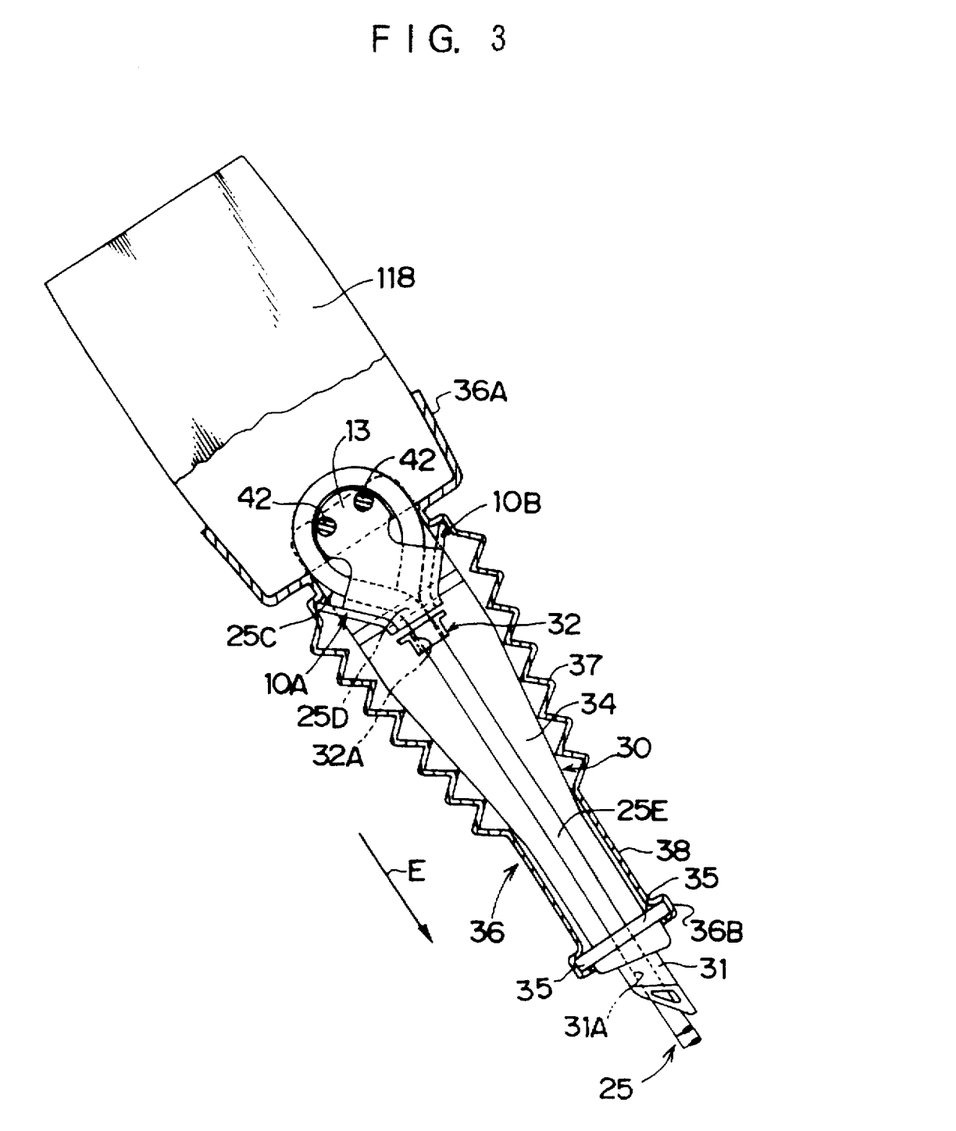
FIG. 3 is an enlarged sectioned front view of the main portion of the preloader apparatus of FIG. 1, which shows a wire engaged with the buckle.

A buckle retraction pulley (hereinafter referred to as a "pulley") 44 is pivotably mounted on the base plate 20 at the side toward which the buckle 118 is to be retracted. As shown in FIG. 2, a gear 21 and wire anchorage grooves 22 and 23 are coaxially formed on the pulley 44 in this order from the side on which the base plate 20 is present.

Winding portions 25A and 25B, which include end portions and their adjacent portions of one wire 25 serving as a flexible elongated standing member for retracting a buckle, are wound around the pulley 44 such that they have the same radius. That is, the end portions of the winding portions 25A and 25B are fixed to the pulley 44 at the same position in the radial direction.

The wire 25 includes two parallel standing portions 25E which extend from the winding portions 25A and 25B, and a loop portion 25C which extends from the upper ends of the standing portions 25E.

Figure 4:
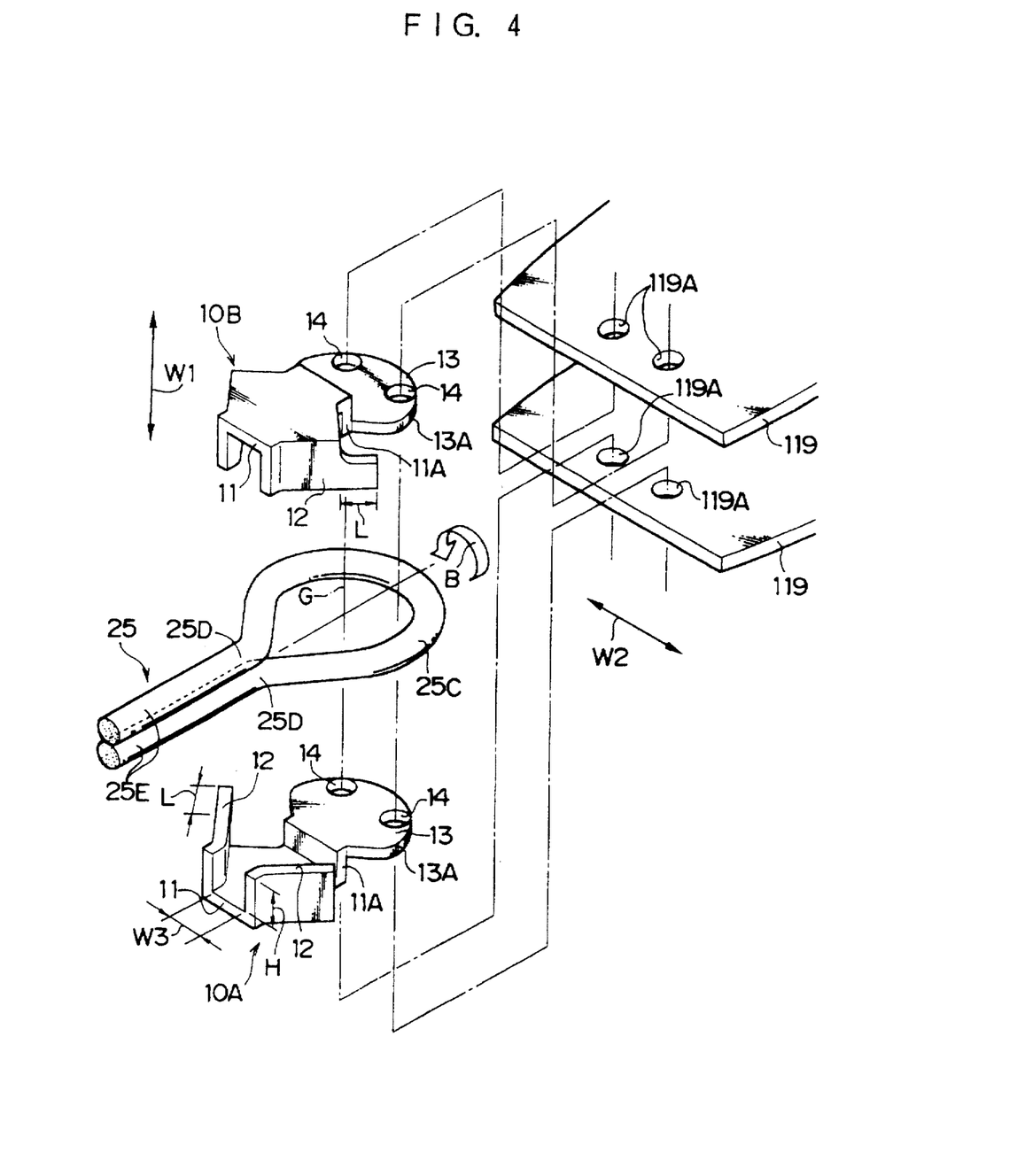
FIG. 4 is an exploded perspective view showing the relation among a pair of buckle bodies, a pair of restraint members, and the wire shown in FIG. 3.

The structure of the loop portion 25C will be described in detail. As shown in FIGS. 2 and 4, the loop portion 25C is circular about a center axis G. The intermediate portions of the wire 25 are twisted by 90 degrees in the direction of arrow B in FIG. 4 to form twisted portions 25D such that the axis G becomes substantially in parallel with the axis R of the pulley 44 (the center axis of the pulley 44 shown in FIG. 2). The loop portion 25C is continued to the standing portions 25E via the twisted portions 25D.

A pair of restraint members 10A and 10B are attached to the loop portion 25C. As shown in FIG. 4, these restraint members 10A and 10B are formed substantially in the same shape. The restraint members 10A and 10B are attached together face to face while holding therebetween the loop portion 25C and the standing portions 25E, thereby restraining the loop portion 25C, the intermediate twisted portions 25D, and the standing portions 25E. This restrains the twisted portions 25D from untwisting due to their elasticity. In other words, the restraint members 10A and 10B restrain the axis G of the loop portion 25C from rotating in the direction opposite the direction of arrow B, i.e., from a direction W1 toward a direction W2 in FIG. 4.

The structure of the restraint members 10A and 10B will now be described in detail. In each of the restraint members 10A and 10B, a flat mouth portion 11 and a guide portion 13 are integrally formed via a stepped portion 11A, and the mouth portion 11 and the guide portion 13 are substantially in parallel to each other. As shown in FIG. 4, a pair of contact portions 12 stand at right angles to the mouth portion 11 at both sides of the mouth portion 11. The distance between the contact portions 12 increases toward the guide portion 13. One contact portion 12 is longer by L than the other contact portion 12. However, the contact portions 12 may have the same length.

Figure 6:
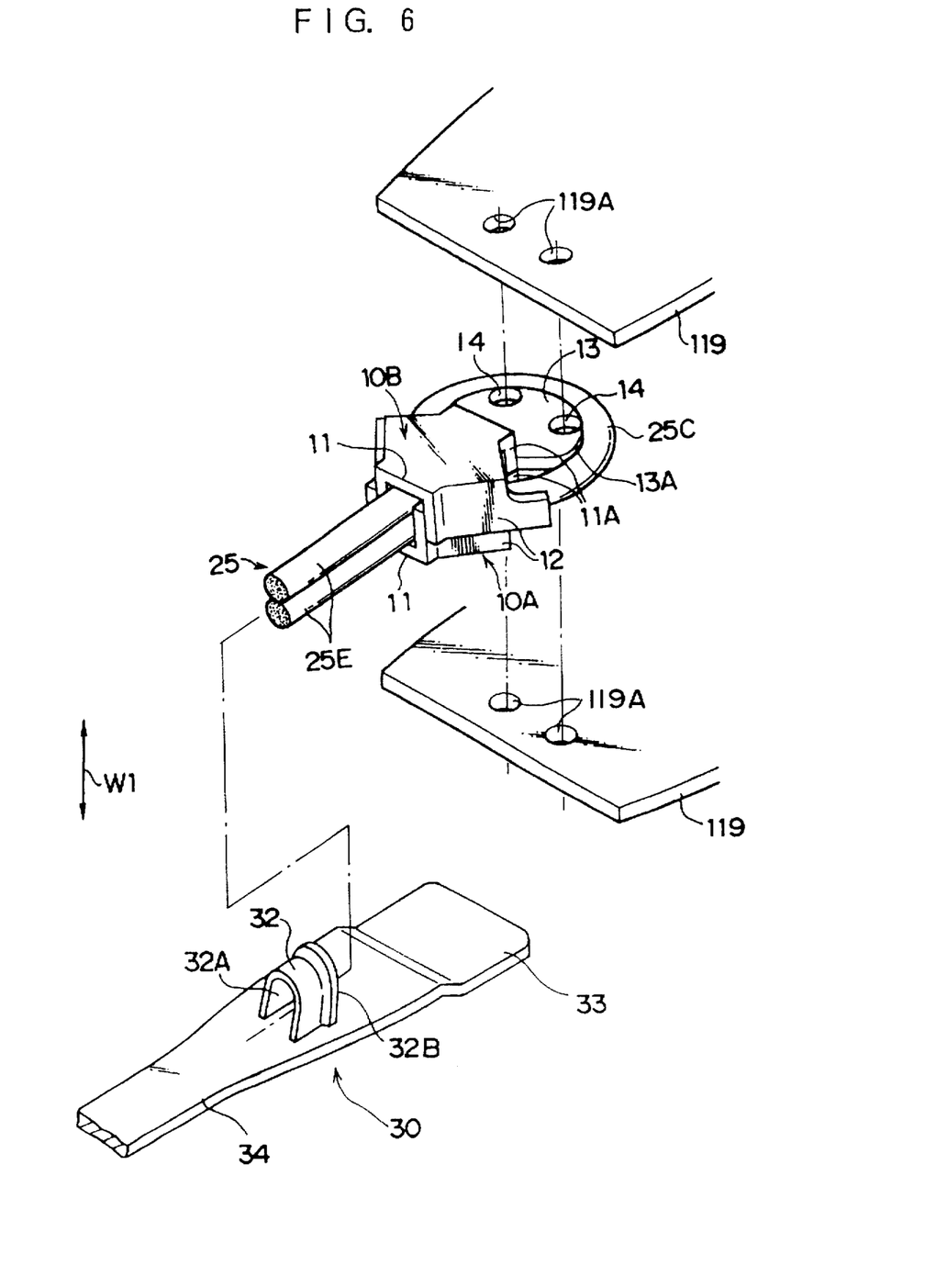
FIG. 6 is a perspective view showing a state in which the other restraint member is attached to the wire, following the state of FIG. 5.
Figure 8:
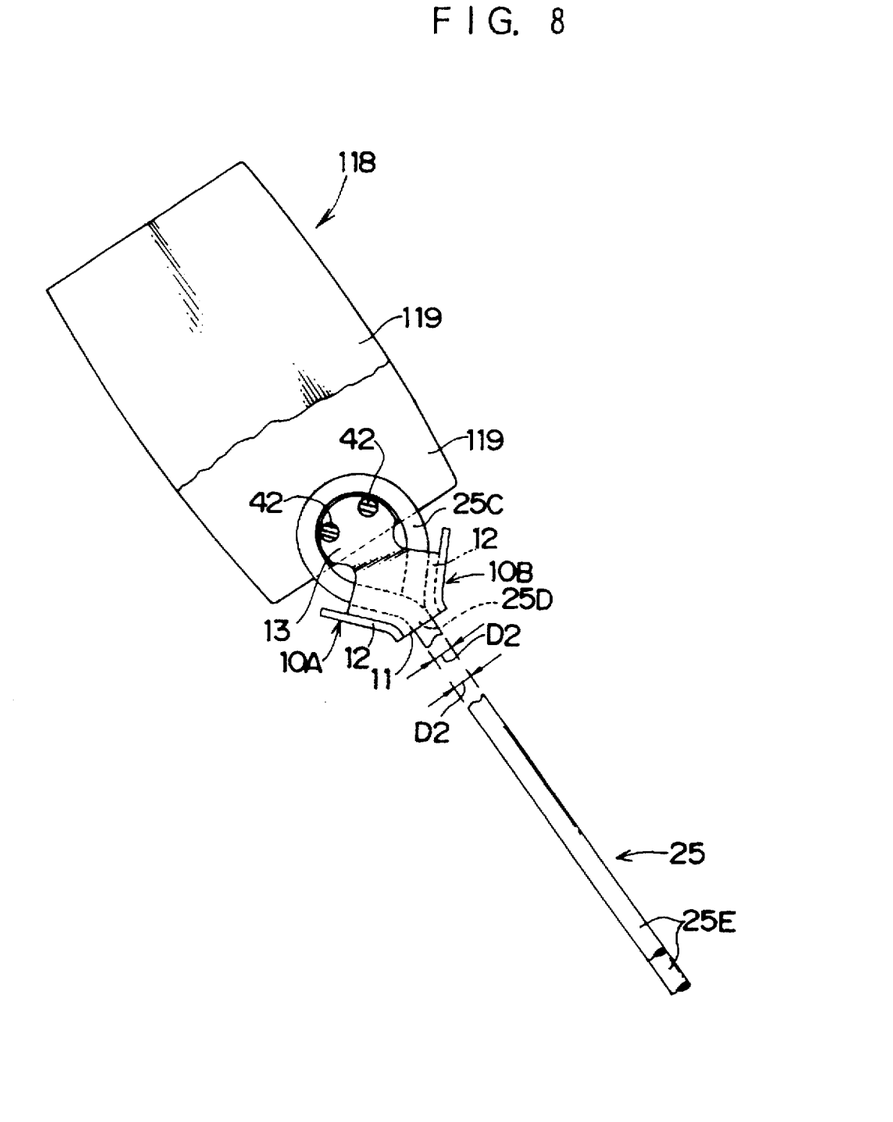
FIG. 8 is a front view showing a state in which the buckle is connected to the wire via the restraint members.

As shown in FIG. 6, these restraint members 10A and 10B are attached to the wire 25 face to face and in such a staggered manner that one contact portion 12 of the restraint member 10A enters between the two contact portions 12 of the restraint member 10B and that one contact member 12 of the restraint member 10B enters between the two contact portions 12 of the restraint member 10A. In order to hold the two overlaid portions of the wire 25 between the mouth portions 11 of the attached restraint members 10A and 10B, height H of the contact portions 12 is substantially double the diameter D2 of the wire 25. As shown in FIG. 6, in order to hold the wire 25 between one contact portion 12 of the restraint member 10A and one contact portion 12 of the restraint member 10B, the minimum distance W3 between a pair of the contact portions 12 is the diameter D2 of the wire 25 plus the thickness of the contact portion 12. As shown in FIG. 8, in a state in which a pair of the restraint members 10A and 10B are attached to the wire 25, the portions of the loop portion 25C continued to the standing portions 25E are held in place such that they abut the corresponding opposed contact portions 12.

Each guide portion 13 is substantially disk-shaped. As shown in FIG. 6, the two guide portions 13 are overlaid one another. Further, the guide portions 13 are formed such that their outer circumferential surfaces closely contact the inner circumferential surface of the loop portion 25C. The total thickness of the two guide portions 13 is equal to the diameter of the loop portion 25C. A pair of through-holes 14 are formed at the upper portion of each guide portion 13 and arranged in the widthwise direction of the buckle 118 with a predetermined distance therebetween. Mounting holes 119A corresponding to the through-holes 14 are formed at the lower portion of each of two metallic buckle bodies 119, which form part of the buckle 118. A shaft portion 42 (see FIG. 1) of a rivet is inserted into each group of the mounting holes 119A and the through-holes 14, thereby fixing the restraint members 10A and 10B to the buckle bodies 119.

Accordingly, in the present embodiment, the twisted portions 25D are held by the contact portions 12 of the restraint members 10A and 10B, and the loop portion 25C is held by the buckle bodies 119. Since the restraint members 10A and 10B are fixedly connected with the buckle bodies 119, the twisted portion 25D and the loop portion 25C are restrained against the relative movement along the direction of arrow B, thereby restraining the twisted portion 25D from untwisting. However, the clearance between the two guide portions 13 may be modified so as to hold the loop portion 25C between the guide portions 13 like the buckle bodies 119 hold the loop portion 25C therebetween. Alternatively, part of each guide portion 13 may be extended so as to hold the loop portion 25C therebetween. Even in these cases, the buckle 118 is connected to the restraint members 10A and 10B. Since the restraint members 10A and 10B are held between the buckle bodies 119, the restraint members 10A and 10B and their adjacent portions are more reliably held in place. The restraint members 10A and 10B may be attached to the buckle 118 via another member.

As shown in FIG. 2, a plate-like supporting member 30 is disposed along the longitudinal direction of the wire 25. The supporting member 30 is made of a hard synthetic resin. A cylindrical portion 31 is integrally formed at the lower portion of the supporting member 30. As shown in FIG. 6, a supporting guide portion 32 having a substantially U-shaped cross section is integrally formed at the upper portion of the supporting member 30. A through-hole 32A is eventually formed in the supporting guide portion 32. The size of the through-hole 32A is such that the two standing portions 25E, which are overlaid one another in the direction of arrow W1, of the wire 25 can pass through the through-hole 32A. A flange 32B is formed at the top end of the supporting guide portion 32 such that it projects perpendicularly to the supporting guide portion 32. In the supporting member 30, a flat guide surface 34 extends between the cylindrical portion 31 and the supporting guide portion 32. When the buckle 118 is retracted, the buckle 118 moves along the guide surface 34.

As shown in FIG. 2, part of the standing portions 25E of the wire 25 are inserted into a through-hole 31A of the cylindrical portion 31 as well as the through-hole 32A of the supporting guide portion 32A, whereby the standing portions 25E are supported. Thus, the supporting member 30 eventually reinforces the rigidity of the wire 25 and maintains the wire 25 in the standing state. Even when the tongue plate 114 is inserted into the buckle 118, the supporting member 30 bears a load applied to the buckle 118, thereby preventing the wire 25 from deflecting. Upon quick deceleration of a vehicle, the restraint members 10A and 10B which are retracted with the buckle 118 collide with the supporting guide portion 32. As a result, the supporting guide portion 32 is sheared off due to a relevant impact load, thereby not preventing the movement of the restraint members 10A and 10B.

As shown in FIG. 6, a an offset extending portion 33 is formed at the upper end of the supporting member 30. The extending portion 33 is somewhat bent opposite to the supporting guide portion 32 and then extends substantially in parallel with the guide surface 34. As shown in FIG. 2, the upper portion of the extending portion 33 abuts the lower portion of a surface 118A of the buckle 118, thereby maintaining the buckle 118 at a fixed position.

In the supporting member 30, an annular groove 35A is formed in the cylindrical portion 31 in the vicinity of an upper portion 35 of the cylindrical portion 31. An annular engaging portion 36B corresponding to the groove 35A is formed at the lower portion of a boot 36 while an engaging portion 36A corresponding to the lower portion of the buckle 118 is formed at the upper portion of the boot 36. The engaging portion 36B is engaged with the groove 35A, and the engaging portion 36A is fitted to the bottom portion of the buckle 118, thereby anchoring the boot 36 to the supporting member 30 and to the buckle 118. Upon retraction of the wire 25, the cylindrical portion 31 abuts on the pulley 44 or an unillustrated stopper, and thus the cylindrical portion 31 is prevented from moving downward while the wire 25 moves downward.

Contractible bellows 37 and a downwardly located cylindrical portion 38 are integrally formed at the intermediate portion of the boot 36. The inner surface of the cylindrical portion 38 abuts the widthwise side edges of the supporting member 30, which functions as restricting means, so that the inward movement, i.e. the movement of the cylindrical portion 38 toward the standing portions 25E is restricted. Accordingly, while a vehicle is normally traveling, the supporting member 30 prevents the cylindrical portion 38 from deforming inwardly; upon retraction of the buckle 118, the cylindrical portion 38 deforms into bellows-like shape, whereby the cylindrical portion 38 is prevented from being caught by the wire 25.

As shown in FIG. 1, a pawl 27, which is part of a buckle retaining apparatus 19 for preventing the buckle 118 from being drawn out, is provided on the base plate 20 on the rear side of a gear 21 (see FIG. 2) closer to the back of the vehicle such that the pawl 27 is rotatable toward the back of the vehicle (i.e., in the counterclockwise direction in FIG. 1). The pawl 27 is urged by an unillustrated spring in the direction of arrow B (clockwise in FIG. 1) and has two consecutive teeth engaging with the teeth of the gear 21.

A cylinder 46 is provided on the front portion of the main body 40 closer to the front of the vehicle, in parallel with a seat rail 45 disposed substantially in the longitudinal direction of the vehicle. A cylindrical piston 47 is disposed within the cylinder 46 such that it is slidable in the longitudinal direction of the cylinder 46. One end of a wire 26 is connected to the piston 47 at the rear end portion thereof closer to the back of the vehicle (on the rear side of the piston 47). The pulley 44 has a role of converting the direction of power transmission from the sliding direction (direction of arrow K) of the piston 47 to the moving direction (direction of arrow E) of the buckle 118.

An acceleration sensor 48 for detecting acceleration of the vehicle is disposed on the front end of the cylinder 46 closer to the front of the vehicle. An unillustrated detonator is provided on the acceleration sensor 48 at the rear end portion thereof closer to the back of the vehicle. A gas generator 50 is provided at the rear side of the detonator. Upon quick deceleration of the vehicle, the acceleration sensor 48 causes the detonator to ignite, thereby generating gas within the gas generator 50. The generated gas is led into the cylinder 46 to move the piston 47 within the cylinder 46 in the direction of arrow K, thereby applying a tensile force to the wire 26.

The acceleration sensor 48 includes an inertial body (not shown) which moves in an inertial manner toward the front of the vehicle upon detection of a vehicle's acceleration (a negative acceleration generated upon deceleration), a trigger spring (not shown) which always urges the inertial body toward the rear of the vehicle, and a firing pin (not shown) which is always urged toward the detonator by a firing spring so that upon movement of the inertial body toward the front of the vehicle, it can move toward the rear of the vehicle to project into the detonator.

The gas generator 50 contains a booster and a gas generating substance, both not shown. Upon ignition of the detonator, the resulting sparks are led to the booster and converted into thermal energy. This thermal energy causes the gas generating substance to burn and decompose, thereby generating a large amount of gas.

A gas passage 46A for the generated gas is formed above the upper wall of the cylinder 46 adjacent to the gas generator 50. The generated gas instantaneously passes through the passage 46A and enters into a space behind the piston 47, thereby sharply increasing the pressure behind the piston 47. As a result, the piston 47 moves toward the front of the vehicle (in the direction of arrow K of FIG. 1).

The wires 25 and 26 are each wound around and anchored onto the pulley 44 (they are wound around opposite to each other). Accordingly, as the piston 47 moves along the cylinder 46 in the direction of arrow K, a tensile force is applied to the wire 25 in the direction of arrow E as well as to the wire 26 in the direction of arrow K. As a result of the pulley 44 rotating clockwise in FIG. 1 (the direction of retracting the buckle 118 as indicated by arrow B), the wire 25 is taken up onto the pulley 44 along the wire anchorage groove 22, whereby the buckle 118 is retracted. According to the present embodiment, an end portion of each of the wires 25 and 26 is anchored onto the pulley 44. However, after being wound around the pulley 44, the wire 25 may be connected to the piston 47. In this case, the movement amount of the piston 47 is the same as that of the buckle 118.

Next, the operation of the present embodiment having the structure described above will now be described.

Figure 5:
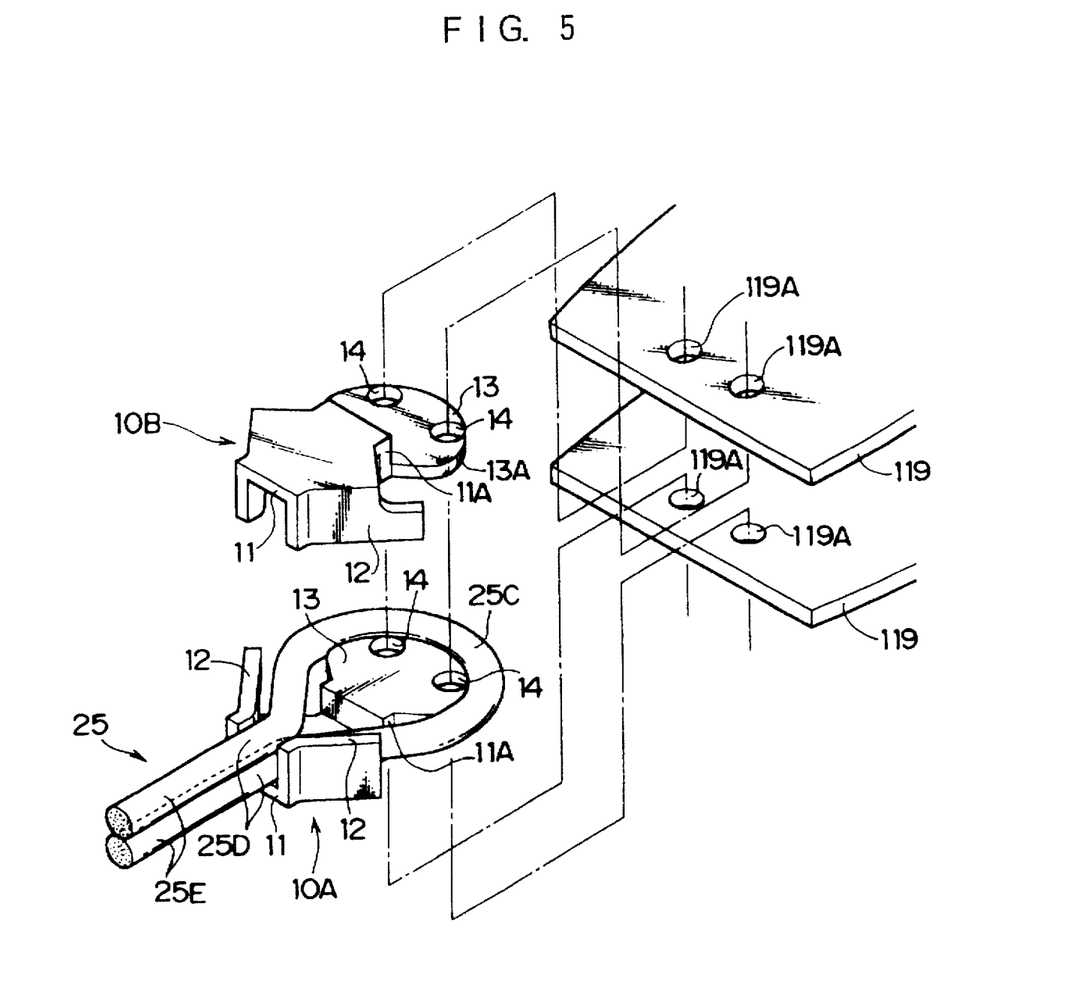
FIG. 5 is a perspective view showing a state in which one restraint member is attached to the wire, following the state of FIG. 4.

First, how to mount the wire 25 to the buckle bodies 119 is described. As shown in FIG. 4, the restraint members 10A and 10B are positioned opposite to each other such that their mouth portions 11 face the loop portion 25C, which is twisted by 90 degrees in the direction of arrow B. As shown in FIG. 5, the restraint member 10A located under the wire 25 is moved upward until the mouth portion 11 receives the twisted portions 25D and part of the loop portion 25C of the wire 25 abuts the circumferential surface 13A of the guide portion 13. As shown in FIG. 6, like the restraint member 10A, the other restraint member 10B located above the wire 25 is moved downward until the mouth portion 11 receives the twisted portions 25D and part of the loop portion 25C of the wire 25 abuts the circumferential surface 13A of the guide portion 13.

Figure 7:
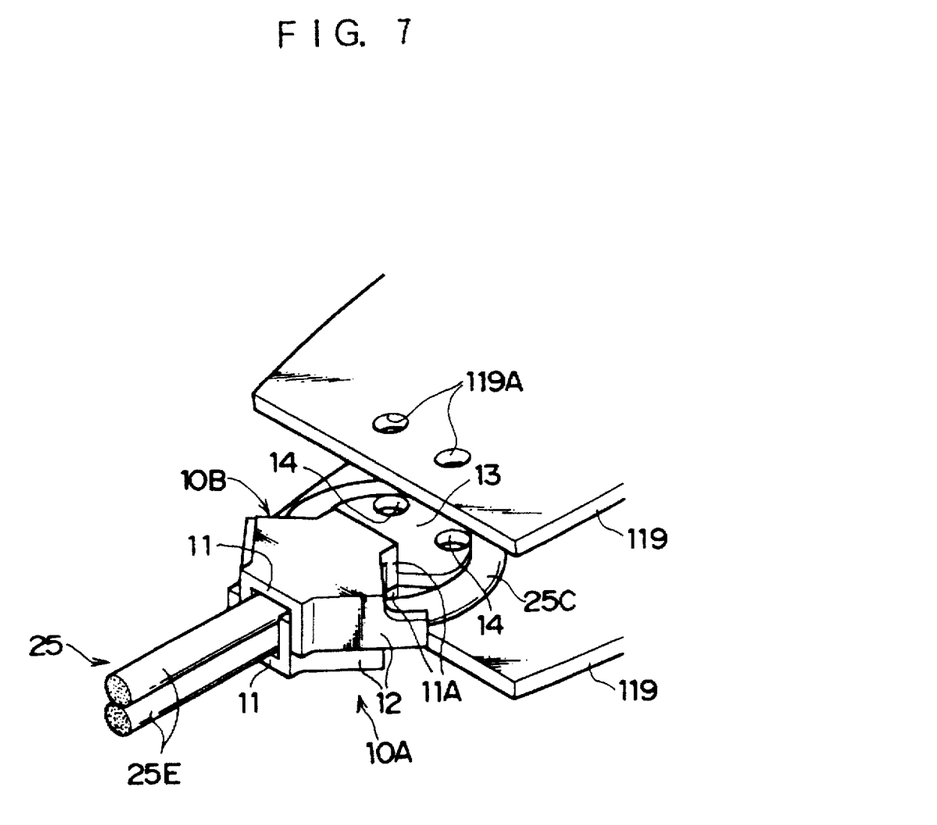
FIG. 7 is a perspective view showing a state in which the restraint members of FIG. 6 are attached to the buckle bodies (the clearance between the buckle bodies 119 is exaggeratingly widened)

As shown in FIG. 7, the restraint members 10A and 10B are inserted between the buckle bodies 119 such that their through-holes 14 are aligned with the through-holes 119A in the buckle bodies 119, thereby establishing the state shown in FIG. 8. The shaft portion 42 of a rivet is inserted into each group of the through-holes 119A and 14. Then, the buckle bodies 119 and the restraint members 10A and 10B are riveted together, thereby fixing the wire 25 to the buckle bodies 119 via the restraint members 10A and 10B. Next, as shown in FIG. 2, the winding portions 25A and 25B of the wire 25 are inserted into the supporting guide portion 32 and the cylindrical portion 31 of the supporting member 30. The assembly of the wire 25 and the supporting member 30, in turn, is inserted into the boot 36. Then, the winding portions 25A and 25B of the wire 25 are wound around and fixed onto the pulley 44. Accordingly, the buckle 118 stands by a seat through the combined rigidity of the wire 25, the boot 36, and the supporting members 30.

As shown in FIG. 1, the loop portion 25C of the wire is twisted by 90 degrees and fixed to the buckle 118. In other words, in the wire 25, there are the twisted portions 25D between the loop portion 25C and the standing portions 25E. Since the restraint members 10A and 10B restrain the loop portion 25C and the standing portions 25E, the twisted portions 25D do not untwist. Accordingly, in the present embodiment, even though the wire 25 is twisted at the twisted portions 25D, the buckle 118 can be maintained at a predetermined position, which facilitates insertion of the tongue plate 114 into the buckle 118. Thus, a driver/passenger can readily insert the tongue plate 114 into the buckle 118.

In the present embodiment, one wire 25 having a relatively large diameter is disposed between the buckle 118 and the pulley 44. However, the present invention is not limited to the use of one wire. For example, two wires each having a smaller diameter may be used in parallel if the total strength of the two smaller-diameter wires is substantially equal to the strength of one larger-diameter wire. In this case, since each smaller-diameter wire is more flexible than the larger-diameter wire, the smaller-diameter wires can be more easily wound around and anchored onto the pulley 44.

Since the winding portion 25A and the winding portion 25B are disposed in parallel to each other around the axis P of the pulley 44 and the standing portions 25E of the wire 25 are disposed in parallel to each other, these portions of the wire 25 are taken up onto the pulley 44 at the same diameter. Thus, a uniform tensile force is applied to the buckle 118.

In the present embodiment, since the restraint members 10A and 10B have the same shape, they are suited for mass production and are more readily installed than those having different shapes.

The usage of the webbing 112 will next be described. As shown in FIG. 11, the tongue plate 114 is inserted into the tongue plate reception port 126 of the buckle 118 to engage with the buckle 118, thereby fastening the webbing 112 onto a driver/passenger. When the webbing 112 is to be unfastened, the release button 128 is pressed to disengage the tongue plate 114 from the unillustrated engagement portion of the buckle 118.

Upon quick deceleration of a vehicle, the inertial body moves toward the front of the vehicle, causing the firing pin to collide with the detonator. As a result of this collision, the detonator ignites, causing the gas generator 50 to generate a large amount of gas, as described previously. This gas passes through the passage 46A and enters a cylinder space behind the piston 47, thereby increasing the pressure behind the piston 47. This causes the piston 47 to move in the direction of arrow K. As a result of this movement of the piston 47, a tensile force is applied to the wire 26. This tensile force causes the buckle 118 to be retracted, via the pulley 44 and the wire 25.

As described above, upon quick deceleration of a vehicle, a tensile force is applied to the wire 28 to pull the wire 25 via the pulley 44 in the direction of arrow E of FIG. 1. As a result, the buckle 118 moves in the direction of arrow E while being guided by the supporting member 30. The mouth portions 11 of the restraint members 10A and 10B of FIGS. 2 and 3 collide with the supporting guide portion 32 of the supporting member 30 and shear off the supporting guide portion 32. Subsequently, the buckle 118 further moves in the direction of arrow E while being guided by the supporting member 30. In this case, since the pulley 44 or a stopper prevents the cylindrical portion 31 of the supporting member 30 from moving, the supporting member 30 is held in the position shown in FIG. 1.

Figure 9:
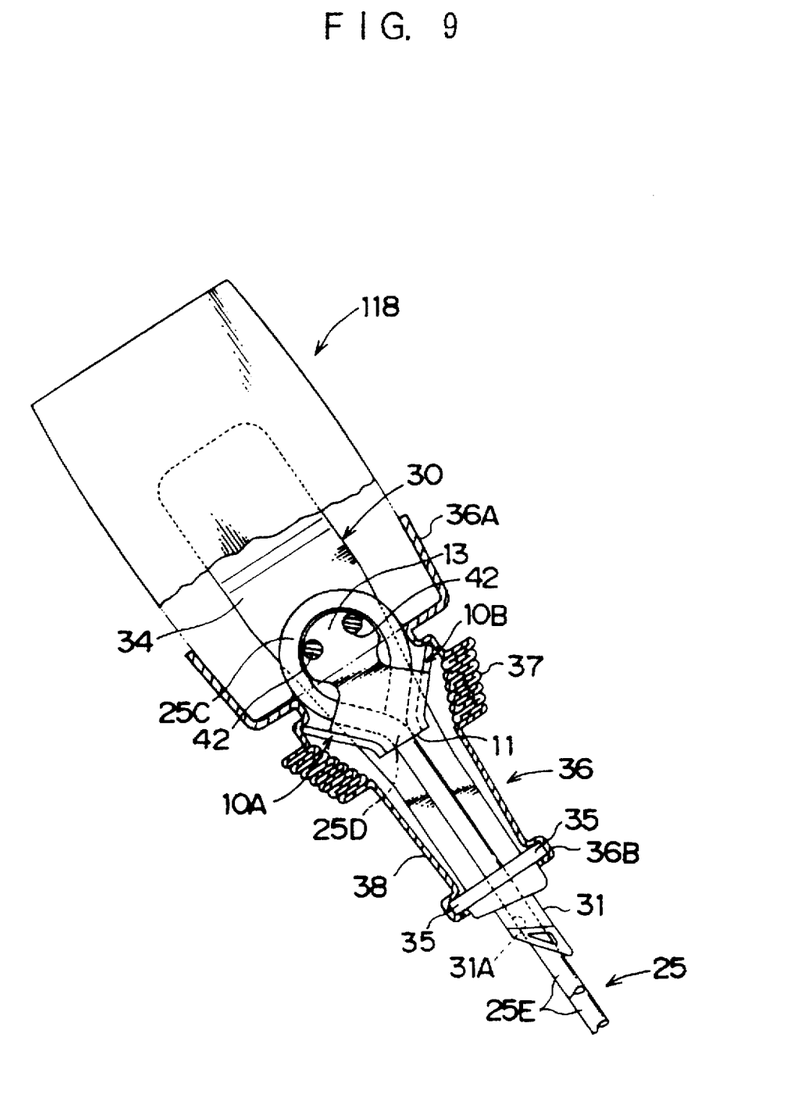
FIG. 9 is a front view showing a state in which the buckle is retracted to some extent from its normal position.
Figure 10:
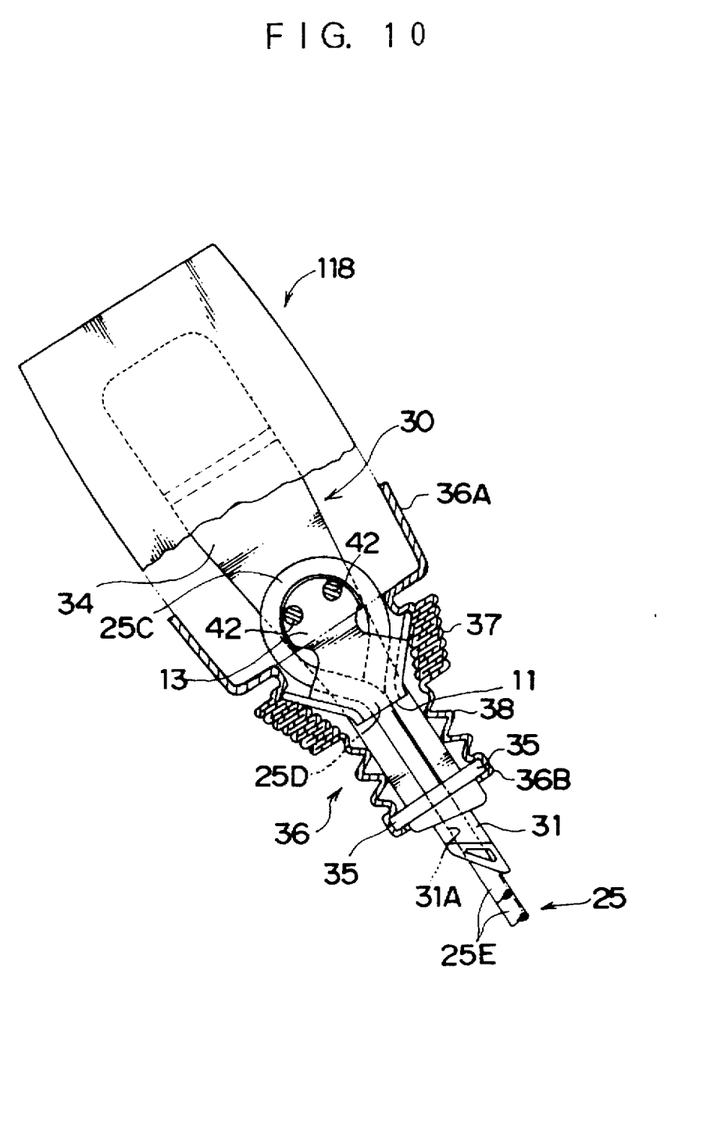
FIG. 10 is a front view showing the state in which the buckle is retracted to some extent from the position shown in FIG. 9.

As the buckle 118 is further pulled, the bellows 37 contract as shown in FIG. 9, and the cylindrical portion 38 of the boot 36 begins to contract as shown in FIG. 10. Subsequently, as the buckle 118 is further pulled, the cylindrical portion 38 deforms into a bellows-like shape.

In the present embodiment, a rotatable pulley is used for the pulley 44 which pulls a wire. However, a stationary guide may be used for the pulley 44. In this case, the wire slides on the guide.

In the present embodiment, a flexible elongated standing member for retracting a buckle is a wire. However, the elongated member is not limited to a wire, but may be a textile rope or the like.

What is claimed is:

1. A preloader apparatus for retracting, upon quick deceleration of a vehicle, a buckle apparatus with which a tongue plate for holding a webbing is engaged so as to fasten the webbing onto an occupant of the vehicle, said preloader apparatus comprising:

a wire connected to said buckle apparatus and adapted to retract said buckle apparatus; and a supporting member for supporting said wire so as to maintain a predetermined portion of said wire in an extended state and whose supporting function is canceled upon retraction of said buckle apparatus, said wire including a loop portion and being connected to said buckle apparatus via said loop portion, the predetermined portion of said wire being composed of two parallel portions, each of which extends from said loop portion in parallel with the other portion, said supporting member having a support portion for supporting part of said parallel portions in the vicinity of said loop portion, said support portion being sheared off upon retraction of said buckle apparatus so as to cancel the supporting function, and said supporting member having a plate-shaped portion which extends along said parallel portions so as to guide said buckle apparatus when said buckle apparatus is retracted.

2. A preloader apparatus according to claim 1, further comprising restraint means for maintaining a state in which said parallel portions are arranged in a direction substantially perpendicular to a plane containing said loop portion.

3. A preloader apparatus according to claim 2, wherein said restraint means has a loop maintaining portion for maintaining the looped shape of said loop portion.

4. A preloader apparatus for retracting, upon quick deceleration of a vehicle, a buckle apparatus with which a tongue plate for holding a webbing is engaged so as to fasten the webbing onto an occupant of the vehicle, said preloader apparatus comprising:

a flexible elongated member including a loop portion connecting said member to said buckle apparatus;

driving means for retracting said buckle apparatus by applying a tensile force to said elongated member upon quick deceleration of said vehicle; and a supporting member for supporting said elongated member so as to maintain a predetermined portion of the elongated member in an extended state and whose supporting function is canceled upon retraction of said buckle apparatus, wherein the predetermined portion of said elongated member is composed of two parallel portions, each of which extends from said loop portion in parallel with the other portion, and wherein twisted portions are provided between said loop portion and said parallel portions such that a plane containing said loop portion is substantially perpendicular to a plane containing said parallel portions.

5. A preloader apparatus according to claim 4, further comprising restraint means for restraining said twisted portions.

6. A preloader apparatus according to claim 5, wherein said restraint means has a loop maintaining portion for maintaining the looped shape of said loop portion.

7. A preloader apparatus according to claim 6, wherein said supporting member has a support portion which supports part of said parallel portions in the vicinity of said twisted portions so as to maintain said parallel portions in an extended state and which is sheared off upon retraction of said buckle apparatus whereby the supporting function is canceled to allow said buckle apparatus to be retracted.

8. A preloader apparatus for retracting, upon quick deceleration of a vehicle, a buckle apparatus with which a tongue plate for holding a webbing is engaged so as to fasten the webbing onto an occupant of the vehicle, said preloader apparatus comprising:

a flexible elongated member connected to said buckle apparatus, driving means for retracting said buckle apparatus by applying a tensile force to said elongated member upon quick deceleration of said vehicle, and a supporting member for supporting said elongated member so as to maintain a predetermined portion of the elongated member in an extended state and whose supporting function is canceled upon retraction of said buckle apparatus, wherein said supporting member has a support portion which supports an upper portion of the predetermined portion of said elongated member so as to maintain said predetermined portion in an extended state and which is sheared off upon retraction of said buckle apparatus whereby the supporting function is canceled to allow said buckle apparatus to be retracted, and wherein said supporting member is provided with a plate-shaped portion which extends along said predetermined portion, and said buckle apparatus is guided by said plate-shaped portion when being retracted.

9. A preloader apparatus according to claim 8, wherein said support portion has a through hole through which said predetermined portion is passed through, and said support portion supports the upper portion of said predetermined portion through an edge portion formed around said through hole.

10. A preloader apparatus according to claim 8, wherein said support portion is provided on said plate-shaped portion.

11. A preloader apparatus according to claim 8, wherein said supporting member is made of a hard synthetic resin.

* * * * *